(12) United States Patent
Kim

(10) Patent No.: US 7,819,240 B2
(45) Date of Patent: Oct. 26, 2010

(54) TRANSFER BELT UNIT AND IMAGE FORMING APPARATUS HAVING THE SAME

(75) Inventor: Yong-sung Kim, Yongin-si (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 326 days.

(21) Appl. No.: 11/585,129

(22) Filed: Oct. 24, 2006

(65) Prior Publication Data

US 2007/0151829 A1 Jul. 5, 2007

(30) Foreign Application Priority Data

Jan. 4, 2006 (KR) .................... 10-2006-0000880

(51) Int. Cl.
*G03G 15/16* (2006.01)
*B65G 39/16* (2006.01)

(52) U.S. Cl. ............... 198/809; 198/626.1; 198/845; 399/165; 399/302

(58) Field of Classification Search ............ 198/809, 198/845, 626.1
See application file for complete search history.

(56) References Cited

U.S. PATENT DOCUMENTS 5,709,765 A * 1/1998 Herbert et al. ............ 156/293
6,160,978 A * 12/2000 Tsuruoka et al. ........... 399/165
6,608,980 B2 * 8/2003 Murayama et al. ......... 399/111

FOREIGN PATENT DOCUMENTS

| CN | 1333171 | 1/2002 |
| JP | 2002-341671 | 11/2002 |
| JP | 2004184697 | 7/2004 |
| KR | 1020030084575 | 11/2003 |

* cited by examiner

*Primary Examiner*—Gene Crawford
*Assistant Examiner*—Kavel P Singh
(74) *Attorney, Agent, or Firm*—Roylance, Abrams, Berdo & Goodman, L.L.P.

(57) ABSTRACT

A transfer belt unit and an image forming apparatus having the same are provided. The transfer belt unit includes a transfer belt circulating and traveling and transferring a toner image formed on a photosensitive body onto a printable medium. A plurality of support rollers support an inner circumference of the transfer belt. A pair of belt guides respectively attached to both edges of the inner circumference of the transfer belt are engaged with a regulating portion disposed in the support rollers to allow the transfer belt to travel in a substantially straight line and each having a joint portion. The joint portion comprises first and second ends separated from each other to be substantially parallel to each other when inclined with respect to a traveling direction of the transfer belt. The second end is located in a posterior position of the first end with respect to the traveling direction of the transfer belt and an external edge of the second end is chamfered.

13 Claims, 5 Drawing Sheets

TRANSFER BELT UNIT AND IMAGE FORMING APPARATUS HAVING THE SAME

CROSS-REFERENCE TO RELATED PATENT APPLICATIONS

This application claims the benefit under 35 U.S.C. §119(a) of Korean Patent Application No. 10-2006-0000880, filed on Jan. 4, 2006, in the Korean Intellectual Property Office, the entire disclosure of which is hereby incorporated by reference.

BACKGROUND OF THE INVENTION

1. Field of the Invention

The present invention relates to a transfer belt unit and an image forming apparatus. More particularly, the present invention relates to a transfer belt unit in which meandering of a transfer belt for transferring a toner image onto a printable medium is substantially prevented, and an image forming apparatus having the same.

2. Description of the Related Art

Examples of printable mediums include paper sheets on which an image is to be printed, photographic paper, overhead projector (OHP) film, and so forth. Examples of image forming apparatuses include printers, scanners, copying machines, facsimiles, and multi-functional peripheral (MFP) devices in which two or more devices are converged.

Electrophotographic image forming apparatuses form an electrostatic latent image that matches with printing data by irradiating light onto a photosensitive medium. The electrostatic latent image is developed with a toner image using a developing unit. The toner image is transferred onto a printable medium using a transfer belt unit. The toner image is fused on the printable medium using a fusing unit, thereby printing printing data inputted from an external computer on the printable medium.

The transfer belt unit includes a transfer belt and a plurality of rollers that support and drive the transfer belt. The transfer belt directly transfers the toner image onto the printable medium by traveling while the printable medium contacts an outer circumference of the transfer belt, or performs secondary transferring onto the printable medium after the toner image is first transferred on the outer circumference of the transfer belt. Thus, the transfer belt should travel in a straight direction that is identical to a feeding direction of the printable medium so that precise printing can be performed.

However, when a thickness difference exists in the transfer belt, a difference in length occurs in both ends of the transfer belt in a traveling direction such that rotating axes of rollers are not parallel to each other or an outer diameter difference exists in rollers that contact the inner circumference of the transfer belt. This results in the traveling direction of the transfer belt not following a straight line and cause the transfer belt to meander.

When the transfer belt meanders, the toner image of the transfer belt deviates. Particularly, when a color printing operation is performed, superpositioning of respective color images fails so that precision of color registration is lowered. Thus, a unit for substantially preventing meandering of the transfer belt is required. The unit for substantially preventing meandering of the transfer belt guides the transfer belt along a straight line in the traveling direction and substantially prevents a difference in a traveling speed. When the difference of a traveling speed occurs in a partial position at a specific time so that the traveling speed of the transfer belt is not uniform, transfer quality may be degraded at the point of time or in the position intermittently.

Accordingly, a need exists for an image forming apparatus having an improved transfer belt unit that is substantially prevented from meandering and is maintained at a substantially uniform traveling speed.

SUMMARY OF THE INVENTION

The present invention provides a transfer belt unit in which meandering of a transfer belt is substantially prevented, a difference in a traveling speed of the transfer belt is reduced, and an image forming apparatus having such a transfer belt.

According to an aspect of the present invention, a transfer belt unit comprises a transfer belt circulating and traveling and transferring a toner image formed on a photosensitive body onto a printable medium. A plurality of support rollers support an inner circumference of the transfer belt. A pair of belt guides are respectively attached to both edges of the inner circumference of the transfer belt and are engaged with a regulating portion disposed in the support rollers to allow the transfer belt to travel in a straight line. The belt guides each have a joint portion, which has first and second ends separated from each other to be substantially parallel to each other in a state where it is inclined with respect to a traveling direction of the transfer belt. The second end is located in a posterior position of the first end with respect to the traveling direction of the transfer belt and an external edge of the second end is chamfered.

According to another aspect of the present invention, an electrophotographic image forming apparatus comprises a photosensitive body, an exposure unit, a developing unit, a fusing unit, and a transfer belt unit. The transfer belt unit comprises a transfer belt circulating and traveling and transferring a toner image formed on a photosensitive body onto a printable medium. A plurality of support rollers support an inner circumference of the transfer belt. A pair of belt guides are respectively attached to both edges of the inner circumference of the transfer belt and are engaged with a regulating portion disposed in the support rollers to allow the transfer belt to travel in a substantially straight line. The belt guides each have a joint portion. The joint portion comprises first and second ends separated from each other to be substantially parallel to each other when inclined with respect to a traveling direction of the transfer belt. The second end is located in a posterior position of the first end with respect to the traveling direction of the transfer belt, and an external edge of the second end is chamfered.

An external vertex portion of the second end may have an inclined acute angle with respect to the traveling direction of the transfer belt.

Each vertex portion disposed on the first and second ends may be chamfered in a direction parallel to the traveling direction of the transfer belt.

The pair of joint portions may be formed in different positions along the traveling direction of the transfer belt.

A separation distance between the first and second ends may be between approximately 1.5-2.0 mm.

An amount of chamfer with respect to an external edge of the second end may be less than ½ of a thickness of the belt guide.

Objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF EXEMPLARY EMBODIMENTS

The present invention is described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure is thorough and complete, and conveys the concept of the invention to those skilled in the art.

Figure 1:
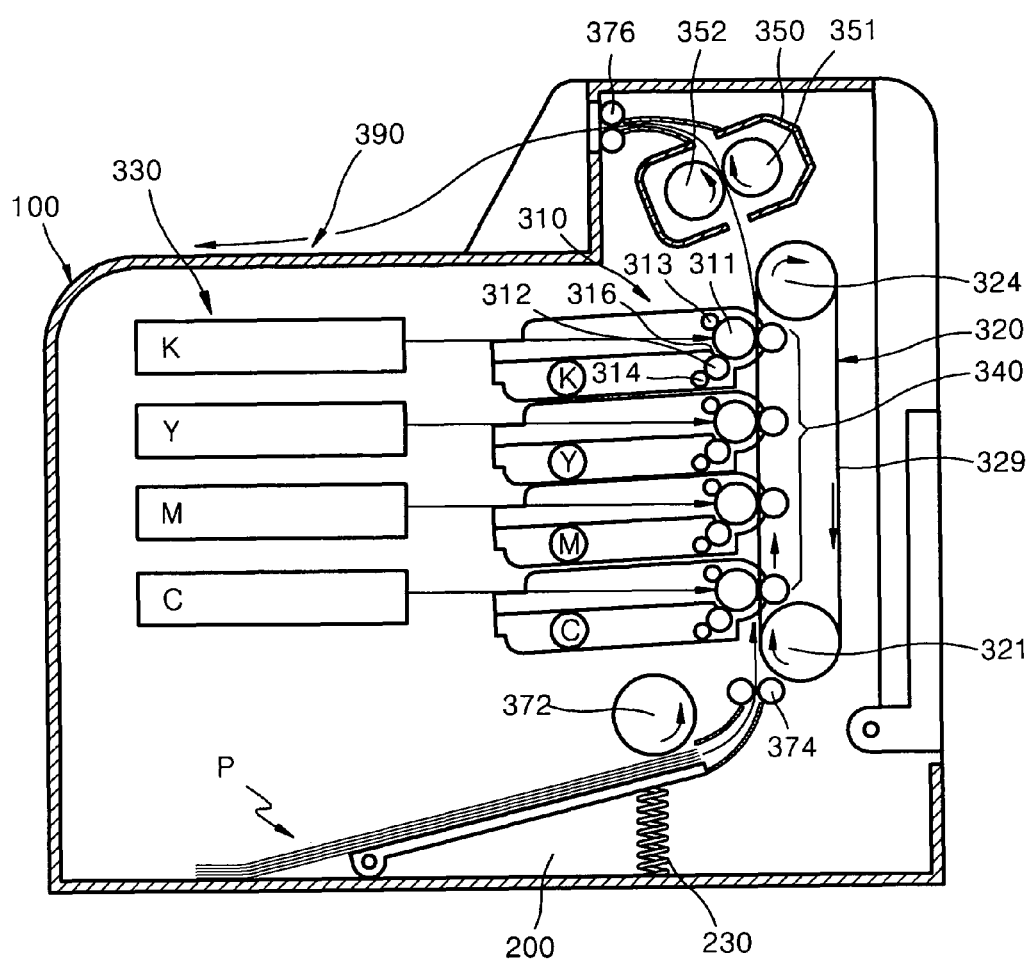
FIG. 1 is an elevational view in partial cross section of a tandem type image forming apparatus according to an exemplary embodiment of the present invention.

FIG. 1 illustrates a tandem type image forming apparatus 100 according to an exemplary embodiment of the present invention. Referring to FIG. 1, the tandem type image forming apparatus 100 includes a photosensitive body 311, an exposure unit 330, a developing unit 310, a fusing unit 350, and a transfer belt unit 320. The image forming apparatus 100 further includes a paper feeding cassette 200 combined with the image forming apparatus 100 to be detached or attached thereto or therefrom, a knock-up plate on which a printable medium P is stacked and that is elastically supported by a knock-up spring 230, a pickup roller 372 that picks up the printable medium P stacked on the knock-up plate, and a feed roller 374 that feeds the picked-up printable medium P.

The image forming apparatus 100 is a tandem type image forming apparatus that includes four independent photosensitive bodies 311 according to colors and simultaneously performs a transfer operation on four different colors by feeding the printable medium P once. That is, while the printable medium P is transferred once, a complete color image is formed like in a monochrome image so that a time required for color printing is substantially identical to a time required for monochrome printing. Thus, printing speed is very fast.

The color printable tandem type image forming apparatus 100 includes four developing units 310C, 310M, 310Y, and 310K in which toners having colors such as cyan (C), magenta (M), yellow (Y), and black (K), respectively, are stored, and exposure units 330C, 330M, 330Y, and 330K.

Each of the developing units 310C, 310M, 310Y, and 310K includes the photosensitive body 311, a developing roller 312, a charging roller 313, a supplying roller 314, a regulating member 316, and a toner storing unit (not shown). A charging bias voltage is applied to the charging roller 313 to charge an outer circumference of the photosensitive body 311 with a uniform potential.

Each of the exposure units 330C, 330M, 330Y, and 330K forms an electrostatic latent image by irradiating light corresponding to image information of colors, such as cyan (C), magenta (M), yellow (Y), and black (K), onto the photosensitive body 311.

The supplying roller 314 supplies a developing agent stored in the toner storing unit to the developing roller 312. The developing roller 312 contains solid toner as a developing agent, supplies the toner to the electrostatic latent image formed on the photosensitive body 311 and develops the electrostatic latent image as a toner image. A developing bias voltage for supplying the toner to the photosensitive body 311 is applied to the developing roller 312. The regulating member 316, which regulates the amount of the toner attached to the developing roller 312, is installed outside the developing roller 312.

The photosensitive body 311 is installed so that a part of the outer surface is exposed, and is rotated in a predetermined direction. The outer surface exposed to the outer circumference of the photosensitive body 311 opposes a transfer belt 329.

The transfer belt unit 320 includes the transfer belt 329, which travels an endless track, and support rollers 321 and 324, which support both ends of the transfer belt 329 and travel the transfer belt 329. The four transfer rollers 340 are disposed inside the transfer belt 329. Each of the transfer rollers 340 opposes the photosensitive body 311 disposed in each of the developing units 310C, 310M, 310Y, and 310K when the transfer belt 329 is disposed between the transfer roller 340 and the photosensitive body 311. The transfer belt 329 feeds the printable medium P between an opposed surface between the photosensitive body 311 and the transfer roller 340. A transfer bias voltage is applied to the transfer roller 311, and the toner image is transferred onto the printable medium P by mechanical pressure and static electricity that act between the photosensitive body 311 and the transfer roller 340.

That is, in the tandem type image forming apparatus 100, the toner image formed on the outer circumference of the photosensitive body 311 is not intermediately transferred onto the transfer belt 329 but is directly transferred onto the printable medium P. The main difference between the image forming apparatus 100 respectively illustrated in FIGS. 1 and 2 is that the transfer belt 329 transfers the printable medium P between the photosensitive body 311 and the transfer roller 340 in FIG. 1.

The fusing unit 350 includes a heating roller 351 and a pressurizing roller 352. The fusing unit 350 fuses the toner image on the printable medium P by applying heat and pressure to the toner image transferred onto the printable medium P. The heating roller 351 applies heat to the toner image, and the pressurizing roller 352 opposes the heating roller 351 and forms a fusing nip, thereby applying a high pressure to the printable medium P.

The printable medium P that passes through the fusing unit 350 is delivered by a delivery roller 376 to a paper delivery board 390 disposed outside the image forming apparatus 100.

Figure 2:
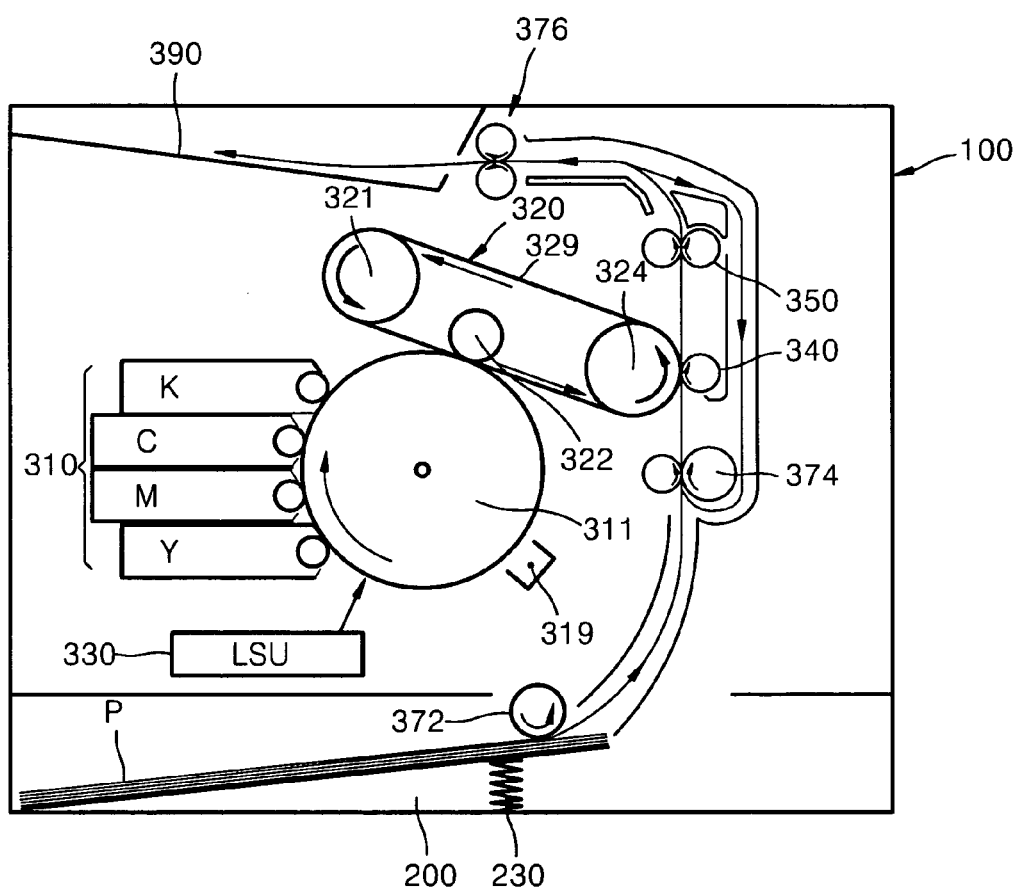
FIG. 2 is an elevational view in partial cross section of an intermediate transfer type image forming apparatus according to an exemplary embodiment of the present invention.

FIG. 2 is an elevational view in partial cross section of an intermediate transfer type image forming apparatus 100 according to an exemplary embodiment of the present invention. Referring to FIG. 2, the intermediate transfer type image forming apparatus 100 includes a photosensitive body 311, an exposure unit 330, a developing unit 310, a fusing unit 350, and a transfer belt unit 320. The image forming apparatus 100 further includes a paper feeding cassette 200 combined with the image forming apparatus 100 to be detached or attached thereto or therefrom, a knock-up plate on which a printable medium P is stacked and which is elastically supported by a knock-up spring 230, a pickup roller 372 that picks up the printable medium P stacked on the knock-up plate, and a feed roller 374 that feeds the picked-up printable medium P.

The intermediate transfer type image forming apparatus 100 performs color printing and includes four developing units 310 in which toners having colors, such as cyan (C), magenta (M), yellow (Y), and black (K), respectively, are stored, and an exposure unit 330.

The photosensitive body 311 is not disposed in each of the four developing units 310, but one photosensitive body 311 is disposed as an independent component proximal the developing units 310. The transfer belt unit 320 includes the transfer belt 329 that travels an endless track, and support rollers 321 and 324, which support both ends of the transfer belt 329 and travel the transfer belt 329. A contact roller 322, which pressurizes the inner circumference of the transfer belt 329 to contact the outer circumference of the photosensitive body 311, is disposed in the inner circumference of the transfer belt 329. The toner image is firstly transferred onto the transfer roller 329 and secondly transferred onto the printable medium P.

There is a difference between the image forming apparatus 100 respectively illustrated in FIGS. 1 and 2, that is, in the tandem type image forming apparatus 100 of FIG. 1, the transfer belt 329 just feeds the printable medium P and the toner image is directly transferred onto the printable medium P from the photosensitive body 311. However, in the intermediate type image forming apparatus 100 of FIG. 2, the toner image is first transferred onto the transfer belt 329 from the photosensitive body 311 and then is transferred onto the printable medium P.

In the printing operation, first, a charger 319 charges the outer circumference of the photosensitive body 311 with a uniform potential. As an exemplary embodiment, the exposure unit 330 forms a yellow electrostatic latent image by irradiating light corresponding to yellow (Y) image information onto the photosensitive body 311. The Y developing unit 310 supplies a yellow toner to the yellow electrostatic latent image to develop the yellow electrostatic latent image as a toner image. The yellow toner image is firstly transferred onto the transfer belt 329. Like in the above-described manner, magenta (M), cyan (C), and black (K) toner images, respectively, are first transferred onto the transfer belt 329, so that the toner image according to each color is superpositioned. The order for transferring the toner image according to each color onto the transfer belt 329 is not limited to this order. Each of four color toner images is superpositioned so that a complete color image is formed on the transfer belt 329. Then, the printable medium P is fed by the pickup roller 210 and the feed roller 220. When the printable medium P reaches a position in which the transfer belt 329 opposes the transfer roller 340, and when a leading end of the toner image formed on the transfer belt 329 reaches a position in which the transfer belt 329 opposes the transfer roller 340 is synchronized. This is because the color toner image should be transferred in a correct position of the printable medium P. The printable medium P passes through the fusing unit 350, the toner image is fused on the printable medium P, and the printable medium P is delivered by the discharging roller 376 to the paper delivery board 390.

Figure 3:
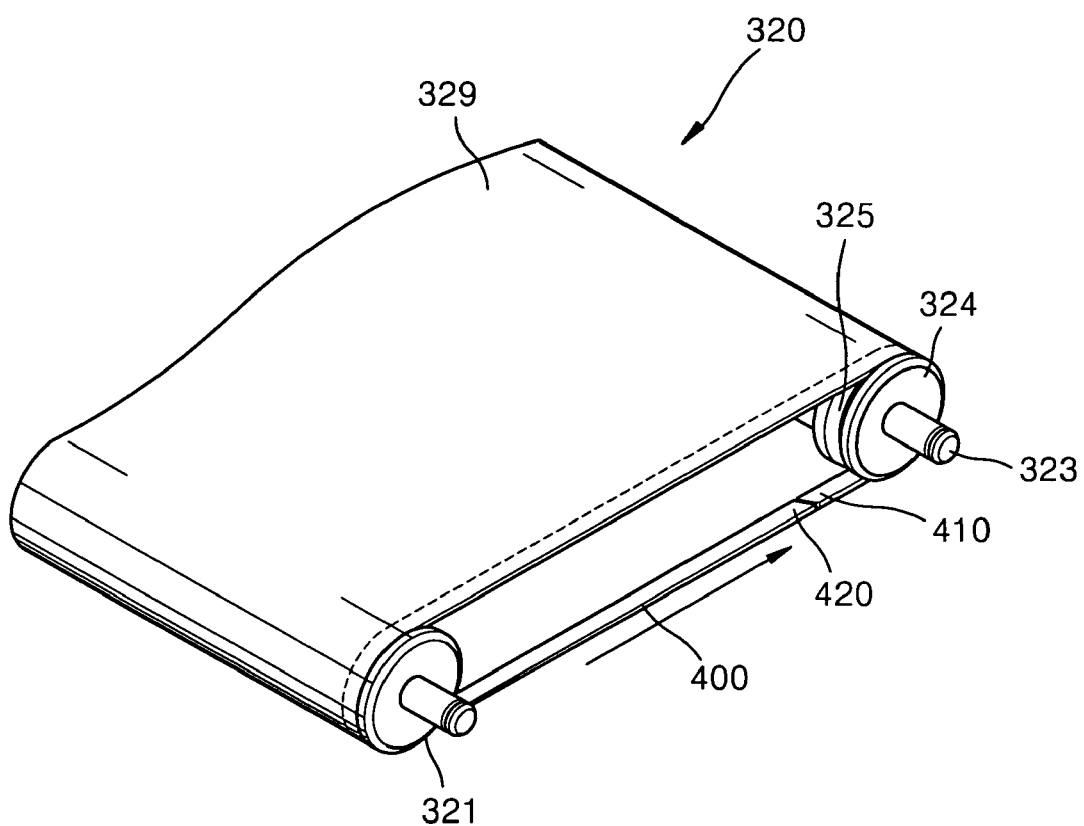
FIGS. 3 and 4 are perspective views of a transfer belt unit according to an exemplary embodiment of the present invention.
Figure 4:
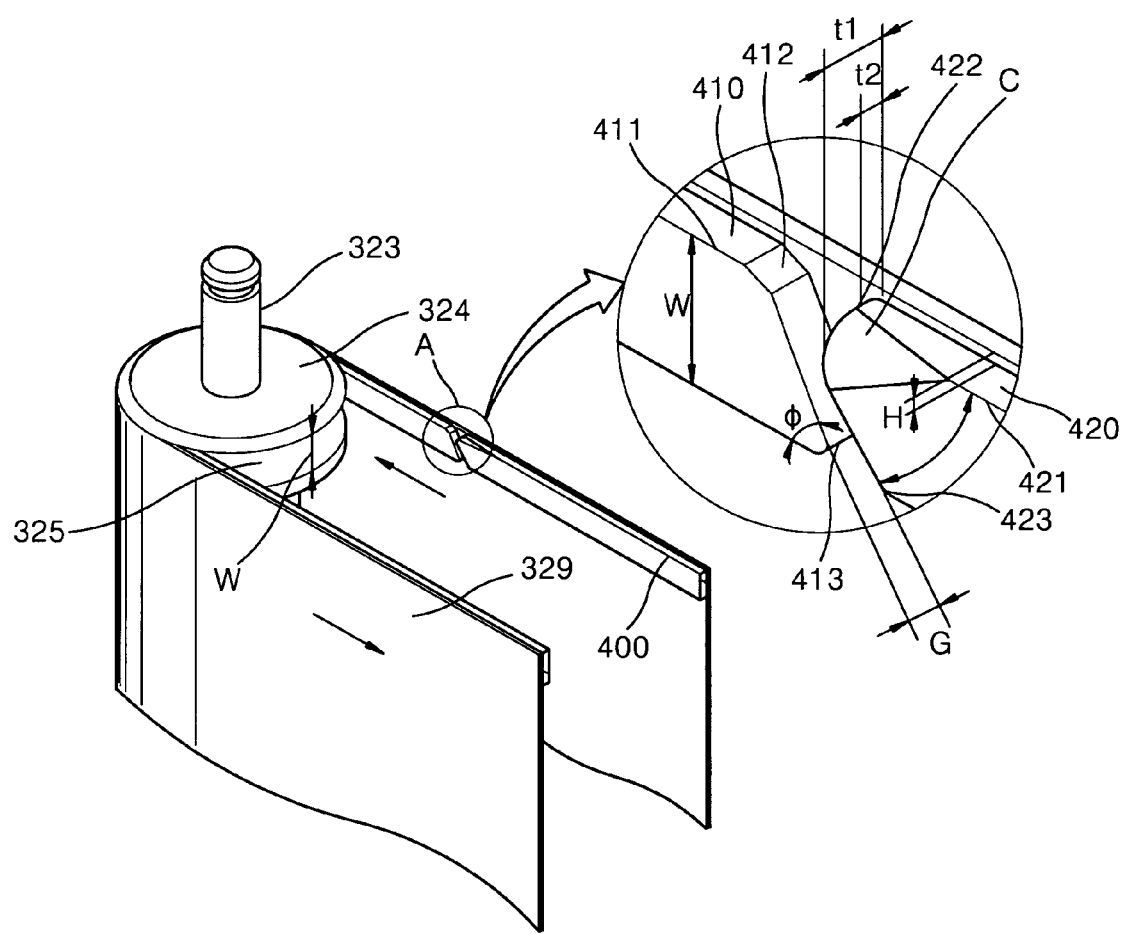
Figure 5:
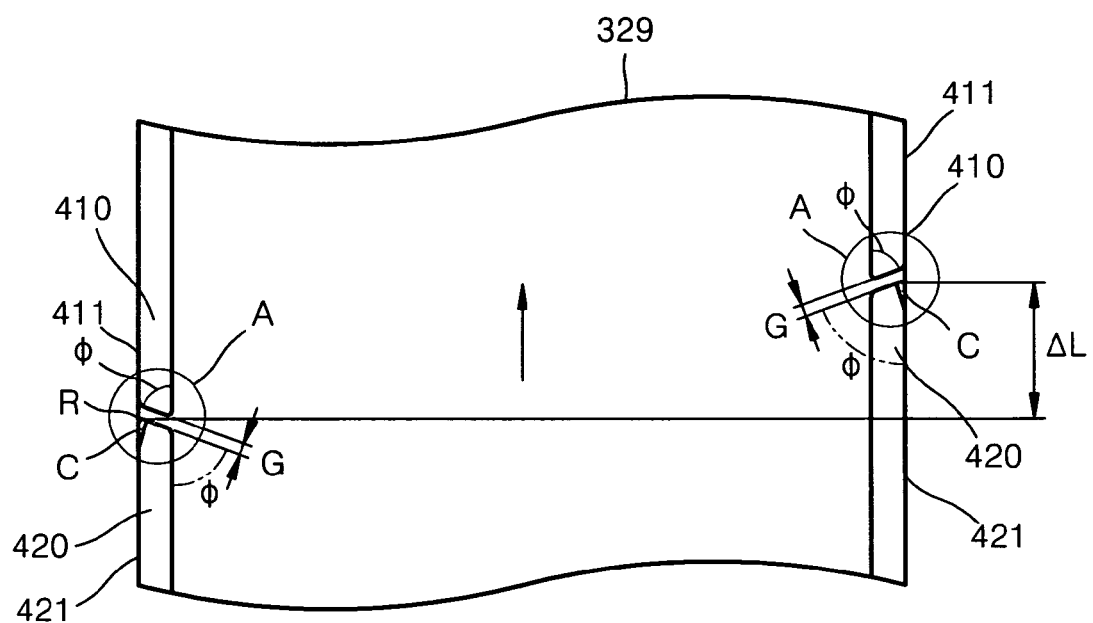
FIG. 5 is a plan view of a joint portion of a transfer belt according to an exemplary embodiment of the present invention.

FIGS. 3 and 4 are perspective views of a transfer belt unit 320 according to an exemplary embodiment of the present invention. FIG. 5 is a plan view of a joint portion A according to an exemplary embodiment of the present invention. Referring to FIGS. 3, 4, and 5, the transfer belt unit 320 includes a transfer belt 329, support rollers 321 and 324, and a belt guide 400. The transfer belt 329 transfers the toner image onto the printable medium P by traveling on an endless track, as described above. An inner circumference of the transfer belt 329 is supported by the support rollers 321 and 324, and the transfer belt 329 is driven according to rotation of the support rollers 321 and 324. Rotating axes 323 of the support rollers 321 and 324 are substantially parallel to each other in a direction substantially perpendicular to a traveling direction of the transfer belt 329 so that meandering of the transfer belt 329 is substantially prevented.

To substantially prevent meandering of the transfer belt 329 and to reduce a difference in speed, the transfer belt 329 may not be seamed in the direction substantially perpendicular to the traveling direction of the transfer belt 329. For example, a material for the transfer belt 329 is produced using a drawing method in a cylindrical shape in which an axial direction extends and a thickness is small, and then is cut to a predetermined length, thereby manufacturing the seamless transfer belt 329.

The belt guide 400 is attached to both edges of the inner circumference of the transfer belt 329, respectively, and guides straight traveling of the transfer belt 329. The belt guide 400 may be fixed in the inner circumference of the transfer belt 329 using an adhesive tape or a bond. A regulating portion 325, which regulates the belt guide 400 so that a traveling direction of the belt guide 400 follows a substantially straight line, is disposed on an outer circumferences of the support rollers 321 and 324, respectively. A width W of the regulating portion 325 (FIG. 4) is substantially identical to a width W of the belt guide 400. The belt guide 400 protrudes on the inner circumference of the transfer belt 329 and is inserted in the regulating portion 325 depressed on the outer circumferences of the support rollers 321 and 324. The regulating portion 325 is engaged with the belt guide 400, maintains a contact state with both sides of the belt guide 400 when the support rollers 321 and 324 are rotated, so that the transfer belt 329 is guided to travel along a substantially straight line.

A seamed portion may not be disposed in the belt guide 400 in the direction substantially perpendicular to the traveling direction of the transfer belt 329. However, it is very difficult to attach the seamless belt guide 400 to the transfer belt 329. To reduce the number of assembling processes and assembling costs and to reduce a traveling speed difference, the belt guide 400 may have a belt shape having a predetermined width and thickness t1 and cut both ends 410 and 420. When the belt guide 400 is attached to the transfer belt 329, the joint portion A, which is connected when both ends 410 and 420 of the belt guide 400 oppose each other, is formed. When both ends 410 and 420 of the belt guide 400 are superpositioned, a thickness difference of the belt guide 400 occurs and the transfer belt 329 is locally jumped so that a traveling speed difference may occur. To substantially prevent this problem, both ends 410 and 420 of the belt guide 400 may be separated from each other and the belt guide 400 may be attached to the transfer belt 329.

To discriminate both ends 410 and 420 of the belt guide 400 from each other, one end attached to a prior position along the traveling direction of the transfer belt 329 is referred to as a first end 410, and the other end attached to a posterior position than the first end 410 is referred to as a second end 420. The first and second ends 410 and 420 may be substantially parallel to each other in an inclined state so that the joint portion A passes through the support rollers 321 and 324 smoothly.

Additionally, on the second end 420, a vertex portion 422 located on an edge of the transfer belt 329 may have an inclined acute angle $\phi$ with respect to the traveling direction of the transfer belt 329. That is, the second end 420 may have an inclination that starts from the vertex portion 422 located on the edge of the transfer belt 329 and reaches an inner vertex portion 423 of the transfer belt 329 along a direction opposite to the traveling direction of the transfer belt 329 to improve traveling stability of the transfer belt 329.

The first end 410 and the second end 420 are separated from each other in a parallel state. Thus, on the first end 410, an inner vertex portion 413 of the transfer belt 329 may have an inclined acute angle φ with respect to a direction opposite to the traveling direction of the transfer belt 329. That is, the first end 410 may have an inclination that starts from the vertex portion 412 located on the edge of the transfer belt 329 and reaches the inner vertex portion 413 of the transfer belt 329 along a direction opposite to the traveling direction of the transfer belt 329. The shape of an inclination formed on each of the first and second ends 410 and 420 may be one of a straight line or a curve.

When the transfer belt 329 travels, the first end 410 first enters the regulating portion 325, a gap between the first and second ends 410 and 420 then enters the regulating portion 325, and then the second end 420 finally enters the regulating portion 325. Due to the second end 420 that enters the regulating portion 325 after the gap, contact shock is generated in the transfer belt 329. In a bad case, the second end 420 may get on a boundary between the outer circumference of the support rollers 321 and 324 and the regulating portion 325, and the transfer belt 329 may deviate from the support rollers 321 and 324. To prevent this problem, an external edge 421 on the second end 420, which engages the regulating portion 325 at the edge of the transfer belt 329, is chamfered. The position and shape of the chamfer is indicated by reference numeral C in FIGS. 4 and 5. The chamfer is shown as a chamfer-processed planar shape but may be a rounding-processed curve shape. The chamfer has a predetermined length in the traveling direction of the transfer belt 329. A thickness t2 of the chamfered vertex portion 422 is smaller than a thickness t1 of the belt guide 400. A depth of the chamfer is determined in consideration of an allowable range of a thickness difference between t1 and t2. Considering the traveling stability of the transfer belt 329, the thickness t2 of the chamfered vertex portion 422 may be ½ larger than the thickness t1 of the belt guide 400. That is, the amount of chamfer t1-t2 with respect to the external edge 421 of the second end 420 may be approximately ½ smaller than the thickness t1 of the belt guide 400.

With the above-described chamfer of the external edge 421, all vertex portions 412, 413, 422, and 423 disposed on the first and second ends 410 and 420 may be additionally chamfered along a direction parallel to the traveling direction of the transfer belt 329.

A separation distance H from sides of the belt guide 400 to both edges of the transfer belt 329 may be substantially close to 0. This is because, when the transfer belt 329 travels, both edges of the transfer belt 329 are substantially prevented from contacting the regulating portion 325 and from being distorted. Additionally, a separation distance G between the first and second ends 410 and 420 may be between approximately 1.5-2.0 mm. When the separation distance G is too small, attachment of the belt guide 400 is difficult and the first and second ends 410 and 420 may be superpositioned. When the separation distance G is too large, a difference in traveling speed of the transfer belt 329 may be generated.

Referring to FIG. 5, a pair of joint portions A formed at the both edges of the transfer belt 329 is formed in different positions along the traveling direction of the transfer belt 329, to reduce contact shock between the support rollers 321 and 324 and the belt guide 400 and the traveling speed difference of the transfer belt 329. An optimum value of a separation distance ΔL between the joint portions A may be searched for by conducting an experiment or other suitable method.

As described above, in the transfer belt unit and the image forming apparatus having the same according to an exemplary embodiment of the present invention, an inclination direction, an inclination angle, a separation distance, a chamfer position, a chamfer direction, a chamfer shape, and a joint position of the both ends of the belt guide are improved such that meandering of the transfer belt is substantially prevented, the traveling speed difference is reduced, the edge portion of the transfer belt is substantially prevented from being distorted or the transfer belt is substantially prevented from being deviated from the support rollers and the number of assembling processes and assembling costs of the belt guide are reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A transfer belt unit, comprising:
a transfer belt circulating and traveling and transferring a toner image formed on a photosensitive body onto a printable medium, the transfer belt having axially opposed outer edges;
a plurality of support rollers supporting an inner circumference of the transfer belt; and
a pair of belt guides respectively attached to both outer edges of the inner circumference of the transfer belt and engaging a regulating portion of each support roller to allow the transfer belt to travel in a substantially straight line, each of the belt guides having a joint portion,
wherein the joint portion comprises first and second ends separated from each other to be substantially parallel to each other and inclined with respect to a traveling direction of the transfer belt, and
the second end is located rearwardly of the first end with respect to the traveling direction of the transfer belt, and an external edge of the second end is chamfered such that a thickness of the chamfered edge is less than a thickness of a remaining portion of the pair of belt guides.

2. The transfer belt unit of claim 1, wherein an external vertex portion of the second end has an inclined acute angle with respect to the traveling direction of the transfer belt.

3. The transfer belt unit of claim 2, wherein each vertex portion disposed on the first and second ends is chamfered in a direction substantially parallel to the traveling direction of the transfer belt.

4. The transfer belt unit of claim 3, wherein the pair of joint portions are formed in different positions along the traveling direction of the transfer belt.

5. The transfer belt unit of claim 1, wherein a separation distance between the first and second ends is approximately between 1.5-2.0 mm.

6. The transfer belt unit of claim 1, wherein an amount of chamfer with respect to an external edge of the second end is less than approximately ½ of a thickness of the belt guide.

7. A transfer belt unit, comprising:
a transfer belt to transfer a toner image formed on a photosensitive body onto a printable medium, the transfer belt having axially opposed first and second outer edges;

a plurality of support rollers supporting an inner surface of the transfer belt and around which the transfer belt travels;

first and second belt guides respectively attached to the first and second outer edges of the inner surface of the transfer belt, the first and second belt guides engaging a regulating portion of each of the plurality of support rollers such that the transfer belt travels in a substantially straight line; and each of the belt guides having a joint portion, the joint portion comprising first and second ends separated from each other and inclined with respect to a traveling direction of the transfer belt, wherein an external edge of the second end is chamfered such that a thickness of the chamfered edge is less than a thickness of a remaining portion of the first and second belt guides.

8. The transfer belt unit of claim 7, wherein the first and second ends of each of the first and second belt guides are substantially parallel.

9. The transfer belt unit of claim 8, wherein the second end is located rearwardly of the first end with respect to the traveling direction of the transfer belt.

10. The transfer belt unit of claim 7, wherein an external vertex portion of the first and second ends of each belt guide has an inclined acute angle with respect to the traveling direction of the transfer belt.

11. The transfer belt unit of claim 10, wherein each vertex portion is chamfered in a direction substantially parallel to the traveling direction of the transfer belt.

12. The transfer belt unit of claim 7, wherein a separation distance between the first and second ends is approximately between 1.5-2.0 mm.

13. The transfer belt unit of claim 7, wherein an amount of chamfer with respect to an external edge of the second end is less than approximately ½ of a thickness of the belt guide.

* * * * *